United States Patent [19]

D'Aniello, Jr.

[11] 4,380,510

[45] Apr. 19, 1983

[54] METHOD OF MAKING LAYERED CATALYSTS

[75] Inventor: Michael J. D'Aniello, Jr., Rochester, Mich.

[73] Assignee: General Motors Corporation, Detroit, Mich.

[21] Appl. No.: 318,132

[22] Filed: Nov. 4, 1981

[51] Int. Cl.³ .................... B01J 21/04; B01J 23/38
[52] U.S. Cl. ........................ 252/466 PT; 252/463; 423/213.5
[58] Field of Search ............... 252/466 PT, 463; 423/213.5

[56] References Cited

U.S. PATENT DOCUMENTS 2,760,940  8/1956  Schwarzenbek ............. 252/466 PT
3,210,296  10/1965  Gray ............................ 252/466 PT
4,152,301  5/1979  Summers et al. ............. 252/466 PT
4,153,579  5/1979  Summers et al. ............. 252/466 PT Primary Examiner—W. J. Shine
Attorney, Agent, or Firm—George A. Grove

[57] ABSTRACT

In a preferred embodiment a solution of a suitable noble metal compound in acetone or other $C_1$ to $C_3$ dialkyl ketone is used to selectively place a noble metal catalyst in a very thin layer on an alumina or base metal modified alumina carrier particle.

4 Claims, No Drawings

METHOD OF MAKING LAYERED CATALYSTS

This invention relates to the making of catalysts, such as for treatment of automobile exhaust gases. More specifically, the subject invention relates to a method of forming one or more thin layers of noble metal catalyst material at the surface of, or within the body of, alumina or base metal modified alumina particulate carriers.

It is known to treat automobile exhaust gases with particulate catalysts for the purpose of oxidizing carbon monoxide and unburned hydrocarbons, and chemically reducing nitrogen oxides. Such catalysts comprise a particle of high surface area alumina carrier on which is dispersed a small quantity of one or more noble metals. The carrier particle may be in the form of a small sphere, ellipsoid, cylinder, cube or the like and is frequentlly called a pellet or bead. The alumina or alumina-based particle has both macroporosity (e.g., holes about 1-2 $\mu$m in diameter) and microporosity (e.g., about 0.01 to 0.02 $\mu$m diameter holes) such that it has a relatively large surface area per unit weight. Only a portion of this area is on the apparent outer surface of the pellet. Due to the porosity of the pellet much of the available surface area is within the body of the pellet.

Different methods have evolved for dispersing the catalyst metal on the available surface of the pellet. In one embodiment the catalyst material is dispersed on absorption sites throughout the whole of the alumina pellet. Much of the catalyst material is thus located deep within the pellet and noxious constituents in the exhaust gas must diffuse into the pellet to reach such catalyst sites. Sometimes it has been found more efficient to locate the expensive platinum or other noble metal material only on a thin, shell-like layer of the pellet at its apparent outer surface, or only on a thin layer just below its apparent surface. In other words, the catalyst material is selectively applied only to a portion of the absorbent surface of the carrier particle. It is also known that the catalyst materials may be dispersed on the pellet on two or more distinct shell-like layers—one layer at the apparent outer surface and the other layer radially inward thereof. In a sectioned spherical pellet, for example, the catalyst layers appear as concentric circular bands. If the pellet is made of pure alumina, noble metal catalysts may be placed in one or more such layers using aqueous solutions of suitable noble metal compounds by techniques described in U.S. Pat. Nos. 4,152,301 and 4,153,579 to Jack C. Summers and Louis Hegedus and assigned to the assignee of this invention.

Particulate catalysts with the active metal concentrated on a thin layer of the carrier near its apparent surface are observed to have good activity for treatment of automobile exhaust gases. A relatively small amount of catalyst metal can serve very efficiently when placed on the carrier in this manner. Furthermore, multilayered catalysts often display improved durability when exposed to exhaust gases containing catalyst poisons. The more resistant platinum is placed on a thin, shell-like layer of the pellet at its surface. The less resistant materials, such as palladium and/or rhodium, are submerged on a thin layer lower in the body of the pellet, and they apparently are somewhat protected from exposure to lead, phosphorus or sulfur.

It is sometimes desirable to modify the active alumina particle by the addition of a base metal. Stabilization of alumina from loss of surface area due to sintering can be accomplished by reacting the alumina with a base metal such as barium. It may also be desirable to apply base metals to the alumina for other purposes, such as a replacement for, or an extender of, the noble metal. Base metal addition may also provide oxygen storage capacity for improved transient performance of the catalyst as the oxygen content of the exhaust gas changes. Nickel, cobalt, chromium, iron and cerium additions have been proposed for these purposes. Summers and Hegedus formed their layered catalysts by treating alumina pellets with aqueous solutions of suitable noble metal salts, while employing suitable acidic blocking agents in positioning the noble metals on the particle at the location desired. Although this technique is moderately useful with cerium modified alumina it does not work with most base metal modified aluminas. When such aluminas are treated with aqueous solutions of noble metal salts, the salts are not absorbed in thin shells on the particle. They are dispersed throughout the whole body.

Accordingly, it is an object of the present invention to provide a method of making a catalyst comprising a base metal (such as, for example, barium) modified alumina particle having a noble metal dispersed on a thin layer of the particle material.

It is another object of the present invention to provide a catalyst with a particulate alumina support, modified by a base metal additive and having one or more distinct layers of noble metals. The base metal may be reacted with the alumina to form an aluminate or the like, or it may be placed on a surface of the alumina carrier. If the carrier particle is generally spherical or ellipsoidal in shape, the layers bearing the noble metal will be in the configuration of spherical shells of desired radial thickness.

It is a still further object of the present invention to provide a simple, preparative method of treating a base metal modified alumina particle with solutions of suitable noble metal compounds in specific organic ketone solvents and optionally with acidic blocking agents so as to form an outer band of one or more noble metals and/or optionally one or more inner bands of noble metals. The resultant pellet may be designed to have improved activity or durability or resistance to poisoning.

My method also provides a means of placing noble metals on very thin layes of unmodified alumina carriers. In fact, it is possible to place the metals in thinner layers than can be accomplished with known aqueous techniques.

BRIEF SUMMARY OF THE INVENTION

In accordance with a preferred embodiment of my invention, these and other objects and advantages are accomplished as follows. Suitable carrier particles of alumina containing a base metal are employed. The particles may be in the shape of generally spherical beads, about 3.0 to 3.4 mm in diameter. The beads preferably have a BET surface area of about 75 to 120 m$^2$/g due to the porosity of the particle. The alumina ($Al_2O_3$) is modified by addition of a suitable base metal, such as, for example, barium, cerium, tin, iron, copper, cobalt, nickel, uranium or lanthanum. The base metal may be dispersed throughout the alumina by impregnating the porous and microporous alumina bead with an aqueous solution of a suitable base metal compound, and then calcining the impregnated bead at a temperature that removes the water, decomposes the compound, and chemically reacts the base metal with the alumina to form a base metal aluminate. Alternatively, a base metal compound may be added in like manner to an alumina bead and calcined at a suitable lower temperature to simply disperse base metal or base metal oxide on the alumina. Whether the alumina merely carries the base metal or is converted to an aluminate, it is modified by base metal for purposes of this invention.

The process is started by saturating the pores of the carrier particles with liquid $C_1$ to $C_3$ dialkyl ketone, for example, acetone. Excess liquid is decanted. This prevents flooding of the pores by the following treatment. Noble metals are then placed on thin, shell-like layers of the modified alumina by soaking the carrier particles in a solution of a suitable compound of the noble metal in acetone or other $C_1$ to $C_3$ dialkyl ketones. Acetone is the preferred solvent. The particles have a high affinity for the solute molecules and the noble metal compounds are abosorbed almost quantitatively in layers whose thickness depends on the quantity of solute. I have found that most base metal modified aluminas do not have a strong affinity for absorbing noble metal compound molecules from water. The noble metal is spread over the whole body of the particle. By using solutions of suitable noble metal compounds in the subject lower dialkyl ketones the compounds are efficiently absorbed on the outermost available (i.e., unblocked) sites on the carrier particles.

Thus I am able to concentrate platinum and/or palladium and/or rhodiumin a thin, dense region less than 100 $\mu$m thick at the outer surface of the particle. By judicious use of acid blocking agents (as described below) that temporarily preferentially block absorbent sites on the bead, I am also able to form one or more distinct thin shells proceeding inward into the bead. For example, I can place platinum in a spherical shell up to 50 $\mu$m thick at the surface of a spherical carrier and palladium in a separate inner band 40 $\mu$m thick, whose outer surface is 70 $\mu$m deep.

By absorbing suitable noble metal compounds onto base metal modified alumina particles from acetone solution, one can place and concentrate the catalyst material in thin layers or bands for most efficient use. I do not believe that this has been possible prior to my invention in connection with most base metal modified aluminas.

Other advantages and objects of my invention will become more apparent from a detailed description thereof which follows.

EXAMPLE 1

Surface 0.1% Pt-Subsurface 0.04% Pd on 4% Fe, 4% Ce/$Al_2O_3$

A sample of Grace LBD alumina ($Al_2O_3$) spheres (BET surface area 110 m$^2$/g, bulk density 0.47 g/ml. radius 1.66 mm) as received was calcined at 300° C. for two hours in air. The sample was allowed to cool to room temperature and a portion was treated with a quantity of an aqueous solution containing Ce(NO$_3$)$_3$.6-H$_2$O and Fe(NO$_3$)$_3$.9H$_2$O just sufficient to fill the pores of the alumina without leaving apparent excess solution (incipient wetness technique). The spheres were calcined at 500° C. for four hours in air. This decomposed the compounds as deposited and fixed the cerium and iron (presumably as their oxides) to the support. Iron and cerium, which are known catalyst extenders, then each made up 4% by weight of the spheres.

After cooling in air, a 100 gram sample of this material was wetted with acetone to fill the sample pores; the excess acetone being decanted after a five minute soak. The wet sample was then treated with a solution of 4 ml of 0.97 M H$_2$SO$_4$ in 450 ml acetone by soaking therein for two hours with occasional shaking. From previous work it was known that the spheres would absorb the acid on an outer layer of the bodies that was about 70 $\mu$m deep. Until removed, the absorbed acid prevents other materials from being absorbed on this region of the pellet.

After this time, the excess solution was decanted and the sample immediately treated with a solution of 40 mg Pd as H$_2$PdCl$_4$ in 450 ml of acetone. This solution was prepared by treating 69 mg of PdCl$_2$ with 65 $\mu$l of concentrated HCl and dissolving the resulting oil of H$_2$PdCl$_4$ in 450 ml of acetone. The sample was allowed to soak for two hours with occasional shaking (more than 98% of the Pd was absorbed as determined by atomic absorption analysis of the residual solution), then filtered off and dried in flowing air for sixteen hours. The sample was calcined at 600° C. for one hour in 5% H$_2$/N$_2$ to remove H$_2$SO$_4$ and to fix the palladium. The material was then cooled to room temperature, wetted with acetone as above, and treated with a solution of 100 mg Pt as H$_2$PtCl$_6$.6H$_2$O in 450 ml acetone. Soaking for two hours with occasional shaking resulted in >99% of the platinum being absorbed. The sample was collected by filtration, dried in flowing air for sixteen hours and calcined at 500° C. for two hours in air.

Thus the nominal noble metal content of the spheres was 0.1% Pt and 0.04% Pd.

Scanning Electron Microprobe analysis of halfspheres indicated that the platinum had been placed on a band of the pellets extending from the surface inward to 50 $\mu$m deep and the palladium was present on a band starting 70 $\mu$m from the edge and extending inward to 110 $\mu$m deep. It will be appreciated that the location of the inner layer of palladium was fixed by the amount of sulfuric acid blocking agent preferentially absorbed on the outer absorption sites. The platinum compound was efficiently absorbed in the thin layer on the outermost sites after removal of the blocking agent.

EXAMPLE 2

Surface 0.1% Pt-Subsurface Coimpregnated 0.04% Pd, 0.006% Rh on 11% Ba, 2% Ce, 1% Ni/$Al_2O_3$ The modified support was prepared as follows, using the Grace LBD alumina described in Example 1. A sample of 10% Ba/$Al_2O_3$ was prepared by the incipient wetness technique with an aqueous solution of barium acetate (Ba(C$_2$H$_3$O$_2$)$_2$.H$_2$O. This material was air dried for sixteen hours and then calcined at 900° C. for four hours in air. This treatment was carried out to convert about 17% of the pellet to barium aluminate in order to improve the thermal stability of the surface area of the pellet.

After cooling, the 10% Ba sample was then treated by the incipient wetness technique with an aqueous solution of Ba(C$_2$H$_3$O$_2$)$_2$.H$_2$O, Ce(C$_2$H$_3$O$_2$)$_3$.6H$_2$O and Ni(C$_2$H$_3$O$_2$)$_2$.4H$_2$O, the amounts of each being such that the composition of the alumina sample became 11% Ba, 2% Ce, 1% Ni. After drying in air for sixteen hours, the material was calcined at 500° C. for four hours in air. This fixed the cerium, nickel and additional barium, presumably as oxides, to serve as catalyst extenders.

A 70 gram sample of this material was wetted with acetone as in Example 1 and treated with a solution of 3.5 ml of 1.0 M $H_2SO_4$ in 525 ml of acetone. The absorbed acid serves as a blocking agent to direct the Pd and Rh to a subsurface layer about 50 μm down. After two hours of soaking, the excess solution was decanted and a solution of 30 mg Pd as $H_2PdCl_4$ in 525 ml of acetone (prepared as in Example 1, 51 mg $PdCl_2$+50 μl conc. HCl) added. The sample was allowed to soak for two hours with occasional shaking, then collected by filtration, air dried for sixteen hours and calcined at 250° C. for two hours. Calcination at 250° C. decomposed the $H_2PdCl_4$ and fixed the palladium but did not remove the acid blocking layer.

The sample was allowed to cool, wetted with acetone as in Example 1, and treated with a solution of 4.8 mg rhodium as $[(C_4H_9)_4N]_2[Rh(CO)Br_4]_2$ in 525 ml acetone. After soaking for two hours with occasional shaking, the sample was collected by filtration; >90% of the rhodium had been absorbed. The sample was then air dried for sixteen hours and then calcined at 600° C. for two hours in 5% $H_2/N_2$ to remove the $H_2SO_4$ and fix the rhodium.

The sample was allowed to cool, wetted with acetone as in Example 1, and treated with a solution of 74 mg Pt as $H_2PtCl_6.6H_2O$ in 525 ml acetone. The sample was allowed to soak for two hours, then collected by filtration, air dried for sixteen hours, and calcined at 500° C. for four hours in 5% $H_2/N_2$.

Scanning Electron Microprobe analysis on halfspheres indicated the presence of a Pt shell layer starting with the surface and extending 50 μm deep and a Pd-Rh coimpregnated layer beginning 53 μm deep and extending inward to 95 μm (i.e., 42 μm wide).

A quantity of the above two-layered platinum-palladium-rhodium on base metal modified alumina beads were evaluated for their ability to treat exhaust gases on a dynamometer mounted gasoline engine. Conversions of 90% for CO, 90% for hydrocarbons and 85% for $NO_x$ were measured.

EXAMPLE 3

Coimpregnated Surface Band, 0.1% Platinum, 0.01% Rhodium on Pure Alumina and Several Base Metal Modified Aluminas A sample of 100 grams Grace LBD alumina spheres was calcined at 300° C. for two hours in air. The sample was allowed to cool to room temperature and then wetted with acetone as described in Example 1. The wetted sample was then treated with a solution of 10 mg rhodium as $[(C_4H_9)_4N]_2[Rh(CO)Br_4]_2$ dissolved in 450 ml of acetone. The sample was left to soak in this solution for one hour, with occasional shaking. This was sufficient time for >98% of the rhodium to be absorbed (atomic absorption analysis of residual solution). After this time, the sample was collected by filtration, dried in flowing room temperature air for sixteen hours, and then calcined at 500° C. for two hours in air.

After this calcination, the sample was allowed to cool to room temperature and then wetted with acetone as before. The sample was then treated with a solution of 100 mg platinum as $H_2PtCl_6.6H_2O$ in 450 ml of acetone and left to soak for one hour with occasional shaking. This was sufficient time for >99% of the platinum to be absorbed. The sample was then filtered off, dried in flowing room temperature air for sixteen hours and calcined at 500° C. for two hours in 5% $H_2/N_2$.

The rhodium and platinum were applied in separate treatments because their two solutions were incompatible. Furthermore, by calcining the absorbed compound of one metal to fix it on the pellet, absorption sites are regenerated within the treated layer that are available to the later applied metal.

Scanning Electron Microprobe analysis of halfspheres showed that the width of the Pt-Rh band was 28 μm, extending from the surface inward. The width of this band is substantially less than that obtained by aqueous techniques using the same amount of metal. The platinum content was 0.1% of the weight of the beads and the rhodium content was 0.01% of the weight of the beads.

In the above example the platinum-rhodium band was formed on a pure alumina bead to demonstrate further utility of the subject method. Platinum and rhodium have been codeposited by the same procedure on like thin surface layers of each of the following base metal modified aluminas:

10% Ba—Alumina
10% Ba, 4% Sn—Alumina
10% Ba, 2% Ni—Alumina
10% Ba, 1.9% Fe—Alumina
10% Ba, 2.1% Cu—Alumina
10% Ba, 2% Co—Alumina
10% Ba, 1.8% Cr—Alumina
4% Sn—Alumina
8% U—Alumina
4.7% La—Alumina
2% Ce—Alumina In each case a narrow, dense band of platinum and rhodium less than about 100 μm was formed at the surface of the base metal modified alumina. The amount of platinum was about 0.1% by weight of the bead and the amount of rhodium was 0.01% by weight of the bead.

EXAMPLE 4

Coimpregnated Surface Band Containing 0.1% Pt, 0.04% Pd on Pure and Base Metal Modified Aluminas A 100 gram sample of the alumina shperes described in Example 1 was heated at 300° C. for two hours in air. After cooling to room temperature, the sample was wetted with acetone, as in Example 1. The wet sample was then treated with a solution of 40 mg of Pd as $H_2PdCl_4$ in 450 ml of acetone. This solution was prepared by treating 69 mg of $PdCl_2$ with 65 μl of concentrated HCl; the resulting oil of $H_2PdCl_4$ was then dissolved in 450 ml acetone. Soaking the sample in this solution for one hour resulted in >99% of the palladium being absorbed. The sample was then filtered off, dried in flowing air for sixteen hours, and calcined at 500° C. for four hours in air.

After this calcination, the sample was allowed to cool to room temperature and wetted with excess acetone as above. The wetted sample was then treated with a solution of 100 mg of platinum as $H_2PtCl_6.6H_2O$ in 450 ml of acetone and left to soak for one hour with occasional shaking. This was sufficient time for >99% of the platinum to be absorbed. The sample was then collected by filtration, dried in flowing air for sixteen hours and calcined at 500° C. for four hours in air.

Scanning Electron Microprobe analysis of halfspheres indicated that the width of the Pt-Pd bands was 28 μm, extending from the surface inward. Again, this is a more dense placement of the metal than is obtained using aqueous techniques. The quantity of platinum on the bead was about 0.1% of the weight of the bead and the quantity of palladium was about 0.04% of the weight of the bead.

The procedure described above in this example was used to form a narrow band of platinum and palladium on the surface of the following base metal modified aluminas:

2% Fe, 2% Ce—Alumina
5% Fe, 5% Ce—Alumina
8% Fe, 8% Ce—Alumina
5% Fe—Alumina
2% Fe, 2% Ni—Alumina
5% Fe, 5% Ni—Alumina
5% Ni—Alumina In each example the procedure successfully formed a platinum-palladium band on a layer of the carrier less than 100 μm thick at the apparent surface of the bead. The platinum content was 0.1% by weight of the bead and the palladium content was 0.04% by weight of the bead.

By the practice of the subject invention, dense, narrow bands of noble metal catalyst materials are formed on base metal modified alumina particulate carriers. Absorption of noble metal solute compounds from acetone or the like is nearly quantitative. It appears that all of the outermost absorbent sites on the particles are filled by the absorbate. Calcination of the dialkyl ketone solution treated particles decomposes the compounds fixing the noble metal on the surface in elemental or oxide form. After calcination, the size of the absorbate moieties are decreased and sites are made available for the absorption of additional metal compounds in the same layer, if desired. This was illustrated in the above Examples 3 and 4. The thickness of a catalyst layer depends on the size of the particle and the quantity of the solute in the treatment solution.

When it is desired to form a catalyst band below the surface of the particle absorbent sites outwardly of the desired level are temporarily blocked by use of a suitable acid blocking agent. In Examples 1 and 2 above, sulfuric acid was used for this purpose. Solutions of solid organic acids, such as citric, malonic or oxalic acid, may be used. Again, the quantity of the acid that is absorbed determines the blocked depth of the particle below which a noble metal compound may be absorbed to form the submerged layer. The required amount of acid required for a specific depth on a specific support is determined experimentally.

The aspect of the invention which permits the formation of such thin catalyst metal layers on base metal modified alumina is the use of a lower dialkyl ketone as the solvent for the noble metal to be absorbed. Acetone is the preferred solvent because it is most common and least expensive of the lower molecular weight dialkyl ketones. However, others, such as methylethyl ketone, diethyl ketone and the like, may be employed. Suitable compounds of platinum, palladium and rhodium that are soluble in acetone were illustrated in the above examples. $H_2PtCl_6 \cdot 6H_2O$ is commercially available. The preparation of $H_2PdCl_4$ was described in the above examples. $[(C_4H_9)_4N]_2[Rh(CO)Br_4]_2$ was prepared as follows. A solution of 1.0 g $[Rh(CO)_2Cl]_2$ (obtained from Alfa) in 30 ml HBr/methanol (3 ml 48% aqueous HBr + 27 ml methanol) was refluxed for 8 hours, after which 2.0 g $(C_4H_9)_4NCl$ were added and the solution evaporated to about 10 ml. On cooling, well formed, reddish brown crystals of the product formed which were filtered off and dried in vacuum over solid KOH (2.7 g, 75%). Analysis calculated for $C_{34}H_{80}N_2O_2Br_8Rh_2$: Rh, 14.9%; found Rh, 14.8%. IR: $\nu_{co}$(methanol)$=2098$ cm$^{-1}$.

Layered catalysts prepared in accordance with my invention are useful in the treatment of automobile exhaust gases. Where one or more noble metals, such as platinum and/or palladium are concentrated in a single shell or layer at the apparent surface of the particle, equal activity is obtainable with smaller amounts of noble metal. The base metal modified alumina may provide thermal stability to the catalyst for additional catalytic activity. Multilayered catalysts may be used for different purposes. Improved resistance to catalyst poisons in the exhaust gas may be obtained by placing the more poison susceptible materials, such as palladium or rhodium, in a layer well beneath the surface of the particle. The poison resistant metal platinum can beneficially be placed in a layer at the surface of the particle. Neither layer is so deep within the particle as to require an extended contact time for diffusion of the gas to be treated into the particle. The subject catalysts are also useful in the three-way mode. In this known practice the automobile engine is operated close to its stoichiometric air-fuel ratio. The air and fuel input to the engine may be operated so that the ratio oscillates slowly about its stoichiometric value. In this case catalyst particles containing platinum and rhodium, or platinum, palladium and rhodium can both complete the oxidation of carbon monoxide and unburned hydrocarbons and effect the reduction of nitrogen oxide. In such catalysts a base metal additive, such as cerium, helps to maintain the activity of the catalyst as the oxygen content of the exhaust gas varies.

Thus, my invention provides a whole new family of useful noble metal-base metal alumina particulate catalysts. My invention also provides a method of making this new family of active and durable particulate catalysts. While the invention has been described in terms of a few examples, it will be appreciated that the scope is not to be limited other than by the following claims.

The embodiments of the invention in which an exclusive property or privilege is claimed are defined as follows:

1. A method of selectively placing noble metal catalyst material on a thin layer of a porous, high surface area alumina or base metal-containing alumina carrier particle where the layer may either be at the apparent outer surface of the particle or, if desired, submerged below the outer surface, comprising saturating the pores of said particle with liquid $C_1$ to $C_3$ dialkyl ketone, if necessary, blocking absorbent pore surface sites in said particle outwardly of the desired position of said layer by applying thereto an acid blocking agent, contacting said particle with a solution of a noble metal catalyst material in a substantially water-free $C_1$ to $C_3$ dialkyl ketone whereby the catalyst material is strongly absorbed on said particle on a layer beginning with the outermost unblocked sites and extending inwardly into said particle a depth determined by the amount of noble metal material in said solution, and calcining said particle to remove said blocking agent, if present, and to fix said noble metal catalyst.

2. A method of selectively placing noble metal catalyst material on a thin layer of a porous, high surface area alumina or base metal-containing alumina carrier particle where the layer may either be at the apparent outer surface of the particle or, if desired, submerged below the outer surface, comprising saturating the pores of said particle with acetone, if necessary, blocking absorbent pore surface sites in said particle outwardly of the desired position of said layer by applying thereto an acid blocking agent, contacting said particle with a solution of a noble metal catalyst material in substantially water-free acetone whereby the catalyst material is strongly absorbed on said particle on a layer beginning with the outermost unblocked sites and extending inwardly into said particle a depth determined by the amount of noble metal material in said solution, and calcining said particle to remove said blocking agent, if present, and to fix said noble metal catalyst.

3. A method of placing noble metal catalyst material on a microporous, high surface area alumina or base metal-containing alumina particle dispersed in a sharp, dense band beginning at the apparent outer surface of the particle and extending inwardly therefrom a desired band width, comprising saturating the pores of said particle with acetone, contacting said particle with a solution of a noble metal catalyst material in acetone whereby the catalyst material is strongly absorbed on said particle on absorbent pore surface sites beginning at the apparent outer surface of of the particle and extending inwardly into said particle a band width determined by the amount of said material in said solution, and calcining said particle to fix said noble metal catalyst.

4. A method of placing noble metal catalyst material on a microporous, high surface area alumina or base metal-containing alumina particle such that the catalyst is dispersed thereon in two or more sharp, dense bands, the first band beginning at the outer apparent surface of the particle and extending inwardly a first band width and the second band beginning inward of said first band and extending further inward a second band width, comprising saturating the pores of said particle with acetone, blocking absorbent pore surface sites in said particle outwardly of the desired position of the second band with an acid blocking agent, contacting said particle with a solution of noble metal catalyst material in acetone whereby the catalyst material is strongly absorbed on said particle as said second band, calcining said particle to remove said blocking agent and to fix the second catalyst band, contacting said particle with a solution of noble metal catalyst material in acetone whereby the catalyst material is strongly absorbed on said particle as said first band, and calcining said particle to fix the first catalyst band.

* * * * *